US006915569B2

(12) United States Patent
Kolbe et al.

(10) Patent No.: US 6,915,569 B2
(45) Date of Patent: Jul. 12, 2005

(54) METHOD OF MANUFACTURING AN ANILOX ROLLER FOR A FLEXOGRAPHIC PRINTING PRESS

(75) Inventors: Wilfried Kolbe, Gülzow (DE); Klaus Schirrich, Bielefeld (DE); Wolfgang Brusdeilins, Bielefeld (DE); Bodo Steinmeier, Bielefeld (DE)

(73) Assignee: Fischer & Krecke GmbH & Co., Bielefeld (DE)

( * ) Notice: Subject to any disclaimer, the term of this patent is extended or adjusted under 35 U.S.C. 154(b) by 0 days.

(21) Appl. No.: 10/305,414

(22) Filed: Nov. 26, 2002

(65) Prior Publication Data

US 2003/0134732 A1 Jul. 17, 2003

(30) Foreign Application Priority Data

Nov. 29, 2001 (EP) ........................................... 01128288

(51) Int. Cl.[7] ............................ B21K 1/02; F16C 13/00

(52) U.S. Cl. ................................ 29/895.23; 29/895.21; 29/895.32; 492/48; 492/53

(58) Field of Search ......................... 29/895.23, 895.21, 29/895.1, 895.3, 895.32; 492/48, 56, 59, 53; 101/382.1, 375

(56) References Cited

U.S. PATENT DOCUMENTS

| | | | | | |
|---|---|---|---|---|---|
| 5,416,298 | A | * | 5/1995 | Robert | 219/121.68 |
| 5,840,386 | A | * | 11/1998 | Hatch et al. | 428/36.9 |
| 6,142,073 | A | * | 11/2000 | Zeman et al. | 101/216 |
| 6,716,148 | B1 | * | 4/2004 | Fortin et al. | 492/47 |
| 2001/0037741 | A1 | * | 11/2001 | Franklin et al. | 101/382.1 |

FOREIGN PATENT DOCUMENTS

| | | |
|---|---|---|
| EP | 0791477 | 8/1997 |
| EP | 1132209 | 9/2001 |

* cited by examiner

*Primary Examiner*—Marc Jimenez
(74) *Attorney, Agent, or Firm*—Richard M. Goldberg

(57) ABSTRACT

A method of manufacturing an anilox roller, in particular for a flexographic printing press, the anilox roller comprising a cylindrical core and a sleeve detachably held on the core and having at its surface an anilox layer with a grid pattern of pits, including the steps of mounting the sleeve on the core, and then forming the anilox layer on the sleeve.

6 Claims, 1 Drawing Sheet

METHOD OF MANUFACTURING AN ANILOX ROLLER FOR A FLEXOGRAPHIC PRINTING PRESS

BACKGROUND OF THE INVENTION

1. Field of the Invention

The invention relates to a method for manufacturing an anilox roller, in particular for flexographic printing machines, the roller comprising a cylindrical core and a sleeve which is detachably held on the core and has at its surface an anilox layer with a grid pattern of pits. The invention further relates to an anilox roller manufactured according to this method and to a method of recycling the same.

2. Description of the Related Art

In flexographic printing, the printing ink is applied onto an impression cylinder by means of an anilox roller. The surface of the anilox roller passes through a chamber-type doctor assembly in which the minute pits of the grid pattern are filled with ink. When, then, the anilox roller comes into contact with the impression cylinder at another location of its circumference, the ink is transferred onto the printing parts of the impression cylinder.

Known anilox rollers typically have a non-deformable cylindrical metal core which is provided with bearing studs at both ends or is detachably mounted on a continues axle, so that it may be supported in a frame of a printing press and may be driven for rotation. In the manufacturing process, the surface of the cylindrical core is provided with a primer layer, and the anilox layer consisting of a ceramic material is then applied directly on the primer layer. Finally, the individual pits are formed in the surface of the anilox layer by means of a laser.

When, after long-term use, the anilox roller shall be reprocessed, because the anilox layer has become damaged or worn, the whole anilox layer and, as the case may be, also the primer layer must be ground away before, after renewed priming, a new anilox layer may be applied and may be provided with the pit pattern by laser processing. This recycling procedure is very cumbersome and expensive.

EP 1 132 209 A discloses an anilox roller in which the cylindrical core is not made of metal but of a synthetic resin reinforced by carbon fibers, so that it has a lower weight at equal stability. Although this facilitates the handling of the anilox roller and improves the smoothness of running, the reprocessing is cumbersome, similarly as in case of a metal anilox roller.

On the other hand, anilox rollers of the type indicated in the opening paragraph of the description are known, which are based on the so-called "sleeve technology". In these anilox rollers, the anilox layer is not applied directly on the cylindrical core but on a hollow cylindrical sleeve which is then thrust onto the cylindrical core. With this technology, it is possible to withdraw the sleeve from the core and to replace it with a new sleeve.

Frequently, the core has a compressed air system with which it is possible to discharge compressed air at locations distributed over the surface of the core, thereby to widen the sleeve, so that it may be thrust on and drawn off more easily. However, this procedure requires a specific and relatively complex construction of the sleeve. When exposed to compressed air, it is desired that only the internal diameter of the sleeve becomes larger, whereas the external diameter should remain unchanged as far as possible, because otherwise the anilox roller made of a ceramic material could become cracked and/or could burst off. Consequently, the sleeve must have, on the inner side of a stiff layer which retains its shape as far as possible and is formed for example by synthetic resin reinforced with glass fibers, a compressible layer which is compressed when the internal diameter is widened. In order for the pneumatic pressure to be evenly distributed on the inner surface of the sleeve, a very thin internal layer of a stiffer material should again be provided below the compressible layer.

In order to achieve a good print quality, it is required that the sleeve has excellent properties in terms of smoothness of running. However, this requirement is difficult to fulfill for sleeves with the construction described above, because, due to the presence of the compressible layer, the stiff outer layer is no longer directly supported on the rigid core. The outer layer must therefore have a high stiffness in itself. This can only be achieved by correspondingly large layer thicknesses, resulting in increased material consumption and costs. Particularly in case of large printing widths, the large wall thickness of the sleeve, for example in the order of 25 mm or more, makes the handling of the sleeve more difficult and increases the mass of inertia of the sleeve hand hence the risk of an imbalance, so that the required smoothness of running is difficult to achieve. Also, the large wall thickness of the sleeve makes it more difficult to comply with the limits for the external diameter of the anilox roller and for the internal diameter thereof, i.e. for the external diameter of the core. The external diameter of the anilox roller must be compatible with the conditions for building-in the roller in the inking unit of the printing press, and limitations regarding the printing process, e.g. drying time for the ink, centrifugal forces at the periphery of the anilox roller, construction of the doctor assembly, etc. must also be taken into consideration. On the other hand, a reduction of the internal diameter leads to increased costs for the core which must then fulfill the same stability requirements with a smaller external diameter.

It is another drawback of the sleeve technology that the anilox layer at the ends of the sleeve is likely to be damaged when a sleeve is thrust onto the core.

When the anilox layer is damaged or worn, the exchange of the whole sleeve is not economical, because of the relatively high costs for the sleeve. Removing the old anilox layer from the sleeve and building a new anilox layer is cumbersome, similarly as in case of conventional anilox rollers in which the anilox layer is formed directly on the core.

SUMMARY OF THE INVENTION

It is an object of the invention to provide a method which permits a simple and cheap manufacture and reprocessing of anilox rollers.

According to the invention, this object is achieved with a method according to the opening paragraph of the description, in which, at first, the sleeve is mounted on the core, and only then the anilox layer is formed on the sleeve.

Thus, when the anilox layer is formed, the sleeve is already firmly seated on the core, so that it is no longer necessary to widen the sleeve and to thrust it onto the core, and, accordingly, there is no risk of damaging the anilox layer. Since, consequently, the sleeve is not required to have a compressible layer, the wall thickness can be reduced significantly, so that material and costs are saved. In addition, the relatively stiff material of the sleeve may be supported directly on the rigid core, so that an excellent smoothness of running of the anilox roller can be assured even in case of a very thin sleeve. In this respect, the anilox roller manufactured according to the method according to the invention has similar advantages as conventional sleeveless anilox rollers. The main advantage in comparison to sleeveless anilox rollers is that the reprocessing of the anilox layer, when it is damaged or worn, causes significantly less labor and costs. Namely, since the sleeve is detachably held on the core, the old sleeve with the anilox layer formed thereon can simply be removed and disposed when a reprocessing is necessary. Then, in place of the old sleeve, a new sleeve is drawn-over, which causes only little costs in view of the small wall thickness and the simple construction of the sleeve, and when the new sleeve is firmly seated on the core, the new anilox layer is formed. Thus, the cumbersome process of grinding away the old anilox layer can be dispensed with, and the time and labor for reprocessing the anilox sleeve is reduced significantly.

Useful embodiments of the invention are indicated in the dependent claims.

As in the conventional sleeve technology, the core may have a compressed air system which facilitates the process of thrusting the sleeve onto the core and, later, the process of removing the sleeve from the core. Since the sleeve is not yet provided with an anilox layer when it is thrust onto the core, it is not harmful when the external diameter of the sleeve is preliminarily increased by the exposure with compressed air. Since, according to the invention, the sleeve is withdrawn from the core only when it is necessary to build a new anilox layer, anyway, it is acceptable when the anilox layer is destroyed while the old sleeve is withdrawn.

Preferably, the wall thickness and the material of the sleeve are so adapted to one another that the intrinsic elasticity of the sleeve permits to thrust the same onto the core—possibly assisted by the compressed air system—and then assures a firm support of the sleeve on the core. Any possible deviation of the sleeve from the desired circular shape, which deviation may be present ab-initio or may be caused when it is thrust onto the core, can subsequently be removed by milling or other surface treatment of the sleeve on the core, before the anilox layer is applied. The anilox layer may be applied in a similar way as in conventional sleeveless anilox rollers by applying at first a primer layer and then a ceramic layer which is given a very uniform thickness in the application process or through post-processing, and by then forming the pits of the grid pattern by means of laser. If necessary, the surface finish may be improved by post-processing.

In the anilox roller according to the invention, the sleeve has preferably only a thickness of 2–5 mm, and it consists, disregarding the ceramic layer and possibly the primer layer, only of a single material layer, preferably of synthetic resin reinforced by glass fibers.

BRIEF DESCRIPTION OF THE DRAWINGS

An embodiment example of the invention will now be explained in conjunction with the drawings, in which.

DETAILED DESCRIPTION

Figure 1:
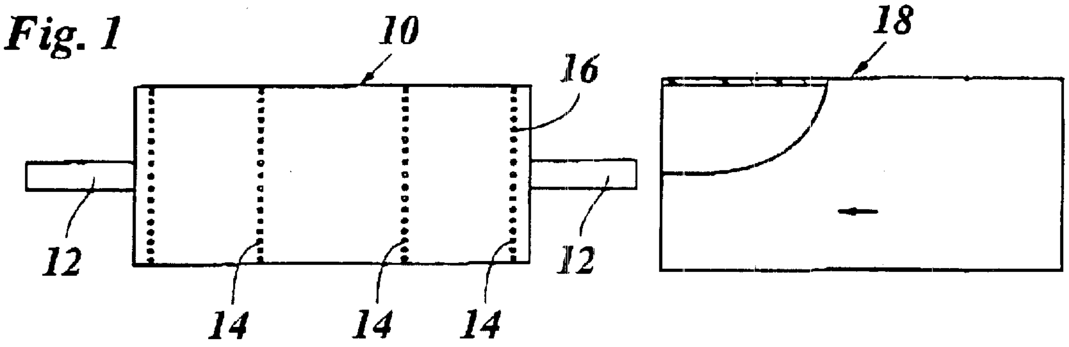
FIG. 1 is a view of a core and, partly broken away, a sleeve in an initial stage of a process of manufacturing an anilox roller.

FIG. 1 shows (not on scale) a view of a core 10 of an anilox roller. The core 10 has the shape of a hollow cylinder and consists of a material which is rigid in shape and nevertheless as lightweight as possible, e.g. steel, aluminum or, preferably, carbon fiber-reinforced synthetic resin. Both ends of the core 10 are provided with bearing studs 12 which serve for supporting the anilox roller in a printing press which has not been shown. Optionally, in place of the bearing studs 12, a continuous axle may be provided onto which the core 10 is detachably clamped by means of a hydraulic system which has not been shown. In the interior of the core 10 and in one of the bearing studs 12, there is provided a compressed air system, known per-se and not shown in detail, via which compressed air may be supplied which is then discharged through several openings 14 distributed over the surface of the core 10. The openings 14 form at least one continuous peripheral ring 16 located at a small distance from the end of the core 10 (on the right in FIG. 1) from which a sleeve 18 is thrust onto the core.

The sleeve 18 has been shown in FIG. 1 to the right of the core 10 and consists of a thin-walled single layer tube of glass fiber-reinforced synthetic resin having a wall thickness of, for example, 2 mm and an internal diameter matched to the external diameter of the core 10. When the sleeve 18 is thrust onto the core 10, the compressed air system is energized, so that compressed air is discharged through the openings 14 and widens the sleeve 18 as soon as the latter is pushed onto one end of the core. When the sleeve 18 has been thrust completely onto the core 10, the compressed air system is switched off, so that the sleeve 18 shrinks elastically and is then firmly held on the core 10. This condition has been shown in FIG. 2.

Figure 2:
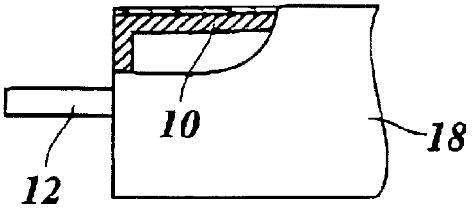
FIG. 2 is a partial view of the anilox roller after the sleeve has been thrust onto the core; layer
Figure 3:
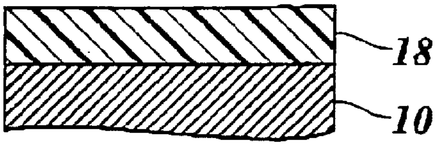
FIGS. 3 to 6 are enlarged drawings of the structure of the anilox roller in different stages of the manufacturing process.

FIG. 3 shows, in an enlarged detail of FIG. 2, the single layer wall of the sleeve 18 which is supported directly on the peripheral surface of the core 10. If necessary, the peripheral surface of the sleeve 18 seated on the core 10 may be post-processed, e.g. on a lathe, so as to achieve a peripheral surface of the sleeve 18 which has an exactly cylindrical shape and is concentric with the axis of the core 10. Any possible minor deformations of the sleeve which may have occurred when the same was thrust onto the core 10 are removed in this way.

Figure 4:
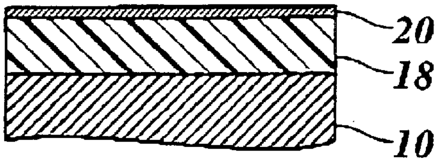
Figure 5:
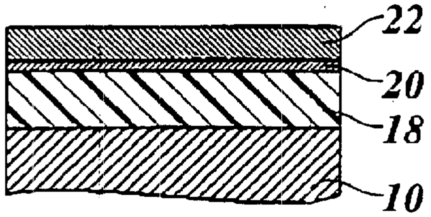

Subsequently, a primer layer 20 is applied to the peripheral surface of the sleeve 18 (FIG. 4), and a ceramic layer 22 (FIG. 5) is then applied on the primer layer by known methods, the thickness of the ceramic layer being adjusted precisely, so that the peripheral surface of the ceramic layer 22 will also be exactly cylindrical.

Figure 6:
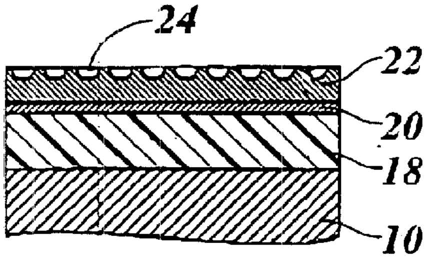
Figure 7:
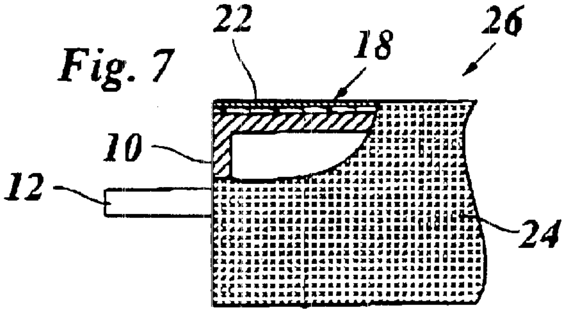
FIG. 7 is a partly broken-away view of the anilox roller obtained by the method according to the invention.

Then, a fine grid of pits 24 is burned into the peripheral surface of the ceramic layer 22 by means of a laser, as has been shown in FIG. 6. In this way, the anilox roller 26 shown in FIG. 7 is obtained as the final product. Since, in this anilox roller, the ceramic layer 22 provided with the pit pattern 24 is supported on the rigid core 10 directly through the relatively thin and essentially incompressible layer of glass fiber-reinforced synthetic resin forming the sleeve 18, the anilox roller 26 has excellent properties in terms of smoothness of running, a low weight for a given stability, and, correspondingly, a low moment of inertia, and a very favorable ratio between the external diameter and the diameter of the core 10.

The sleeve 18 consisting only of a single plastic layer can be manufactured at low expenses and with a little consumption of material.

When the ceramic layer 22 (anilox layer) forming the pit pattern 24 is worn or damaged, the sleeve 18 is removed from the core 10 and disposed. To this end, the compressed air system is preliminarily activated, so that the sleeve can readily been drawn-off from the core 10. Subsequently, a new sleeve 18 is thrust-on in the same manner as in FIG. 1, and the steps illustrated in FIGS. 3 to 6 are repeated, so that a practically new anilox roller is obtained with only little expenditure of labor.

What is claimed is:

1. A method of manufacturing an anilox roller for a flexographic printing press, the anilox roller comprising a cylindrical core and a sleeve detachably held on the core and having at an outer surface thereof an anilox layer with a grid pattern of pits, the method comprising the steps of:

mounting a sleeve consisting of an essentially incompressible material on the core so that the sleeve is supported directly on and directly in contact with a peripheral surface of the core, the step of mounting including the steps of axially thrusting the sleeve onto the core, while preliminarily widening the sleeve by compressed air discharged through openings in a peripheral surface of the core, and then forming the anilox layer on the same incompressible sleeve that is directly mounted on and in contact with the peripheral surface of the core.

2. The method of claim 1, further comprising the steps of, prior to the step of mounting, withdrawing an old sleeve having an anilox layer from the core by preliminarily widening the sleeve by compressed air discharged through openings in the peripheral surface of the core.

3. The method of claim 1, wherein the sleeve is made of glass fiber-reinforced synthetic resin.

4. The method of claim 1, wherein the sleeve includes a single layer of material carrying the anilox layer.

5. The method of claim 4, further comprising the step of interposing a primer layer between said single layer and said anilox layer.

6. The method of claim 1, wherein the sleeve has a wall thickness including the anilox layer which is not larger than 10 mm, for a printing width of the anilox roller of 1.5 to 2 m or more.

* * * * *